(12) United States Patent
Diard et al.

(10) Patent No.: US 9,176,909 B2
(45) Date of Patent: Nov. 3, 2015

(54) AGGREGATING UNOCCUPIED PCI-E LINKS TO PROVIDE GREATER BANDWIDTH

(75) Inventors: Franck Diard, Mountain View, CA (US); Brian Kelleher, Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 12/636,106

(22) Filed: Dec. 11, 2009

(65) Prior Publication Data

US 2011/0145468 A1 Jun. 16, 2011

(51) Int. Cl.
*G06F 13/40* (2006.01)
*G06F 13/20* (2006.01)

(52) U.S. Cl.
CPC ...................................... *G06F 13/20* (2013.01)

(58) Field of Classification Search
CPC .......... G06F 2213/0026; G06F 3/1438; G06T 2210/52; G09G 2360/06
USPC ........... 710/22, 104, 105, 107, 301, 305, 307, 710/316, 317
See application file for complete search history.

(56) References Cited

U.S. PATENT DOCUMENTS

| | | |
|---|---|---|
| 3,940,740 A | 2/1976 | Coontz |
| 4,541,075 A | 9/1985 | Dill et al. |
| 4,773,044 A | 9/1988 | Sfarti et al. |
| 4,885,703 A | 12/1989 | Deering |
| 4,951,220 A | 8/1990 | Ramacher et al. |
| 4,985,988 A | 1/1991 | Littlebury |
| 5,036,473 A | 7/1991 | Butts et al. |
| 5,125,011 A | 6/1992 | Fung |
| 5,276,893 A | 1/1994 | Savaria |
| 5,379,405 A | 1/1995 | Ostrowski |
| 5,392,437 A | 2/1995 | Matter et al. |
| 5,448,496 A | 9/1995 | Butts et al. |
| 5,455,536 A | 10/1995 | Kono et al. |
| 5,513,144 A | 4/1996 | O'Toole |
| 5,513,354 A | 4/1996 | Dwork et al. |
| 5,578,976 A | 11/1996 | Yao |
| 5,630,171 A | 5/1997 | Chejlava, Jr. et al. |
| 5,634,107 A | 5/1997 | Yumoto et al. |
| 5,638,946 A | 6/1997 | Zavracky |
| 5,671,376 A | 9/1997 | Bucher et al. |
| 5,694,143 A | 12/1997 | Fielder et al. |
| 5,705,938 A | 1/1998 | Kean |
| 5,766,979 A | 6/1998 | Budnaitis |
| 5,768,178 A | 6/1998 | McLaury |
| 5,805,833 A | 9/1998 | Verdun |
| 5,884,053 A | 3/1999 | Clouser et al. |
| 5,896,391 A | 4/1999 | Solheim et al. |

(Continued)

OTHER PUBLICATIONS

Dictionary.com. definition of "monitor." Viewed Jun. 15, 2011.*

(Continued)

*Primary Examiner* — Raymond Phan

(57) ABSTRACT

Embodiments of the claimed subject matter are directed to systems and a method that allows the aggregation of multiple interfaces of a single data communication bus to provide greater bandwidth for communication between a peripheral device and system memory within a computing system. In one embodiment, a system is provided wherein the unoccupied interfaces of the data communication bus is aggregated with an occupied interface coupled to a peripheral device to increase the bandwidth of data transfer requests between the peripheral device and the system memory.

27 Claims, 5 Drawing Sheets

(56) References Cited

U.S. PATENT DOCUMENTS

| | | | |
|---|---|---|---|
| 5,909,595 A | 6/1999 | Rosenthal et al. | |
| 5,913,218 A | 6/1999 | Carney et al. | |
| 5,937,173 A | 8/1999 | Olarig et al. | |
| 5,956,252 A | 9/1999 | Lau et al. | |
| 5,996,996 A | 12/1999 | Brunelle | |
| 5,999,990 A | 12/1999 | Sharrit et al. | |
| 6,003,083 A * | 12/1999 | Davies et al. | 709/226 |
| 6,003,100 A | 12/1999 | Lee | |
| 6,049,870 A | 4/2000 | Greaves | |
| 6,065,131 A | 5/2000 | Andrews et al. | |
| 6,067,262 A | 5/2000 | Irrinki et al. | |
| 6,069,540 A | 5/2000 | Berenz et al. | |
| 6,072,686 A | 6/2000 | Yarbrough | |
| 6,085,269 A | 7/2000 | Chan et al. | |
| 6,094,116 A | 7/2000 | Tai et al. | |
| 6,219,628 B1 | 4/2001 | Kodosky et al. | |
| 6,249,288 B1 | 6/2001 | Campbell | |
| 6,255,849 B1 | 7/2001 | Mohan | |
| 6,307,169 B1 | 10/2001 | Sun et al. | |
| 6,323,699 B1 | 11/2001 | Quiet | |
| 6,348,811 B1 | 2/2002 | Haycock et al. | |
| 6,363,285 B1 | 3/2002 | Wey | |
| 6,363,295 B1 | 3/2002 | Akram et al. | |
| 6,366,968 B1 | 4/2002 | Hunsaker | |
| 6,370,603 B1 | 4/2002 | Silverman et al. | |
| 6,377,898 B1 | 4/2002 | Steffan et al. | |
| 6,388,590 B1 | 5/2002 | Ng | |
| 6,389,585 B1 | 5/2002 | Masleid et al. | |
| 6,392,431 B1 | 5/2002 | Jones | |
| 6,429,288 B1 | 8/2002 | Esswein et al. | |
| 6,429,747 B2 | 8/2002 | Franck et al. | |
| 6,433,657 B1 | 8/2002 | Chen | |
| 6,437,657 B1 | 8/2002 | Jones | |
| 6,486,425 B2 | 11/2002 | Seki | |
| 6,504,841 B1 | 1/2003 | Larson et al. | |
| 6,530,045 B1 | 3/2003 | Cooper et al. | |
| 6,535,986 B1 | 3/2003 | Rosno et al. | |
| 6,598,194 B1 | 7/2003 | Madge et al. | |
| 6,629,181 B1 | 9/2003 | Alappat et al. | |
| 6,662,133 B2 | 12/2003 | Engel et al. | |
| 6,700,581 B2 | 3/2004 | Baldwin et al. | |
| 6,701,466 B1 | 3/2004 | Fiedler | |
| 6,717,474 B2 | 4/2004 | Chen et al. | |
| 6,718,496 B1 | 4/2004 | Fukuhisa et al. | |
| 6,734,770 B2 | 5/2004 | Aigner et al. | |
| 6,738,856 B1 | 5/2004 | Milley et al. | |
| 6,741,258 B1 | 5/2004 | Peck, Jr. et al. | |
| 6,747,483 B2 | 6/2004 | To et al. | |
| 6,782,587 B2 | 8/2004 | Reilly | |
| 6,788,101 B1 | 9/2004 | Rahman | |
| 6,794,101 B2 | 9/2004 | Liu et al. | |
| 6,806,788 B1 | 10/2004 | Marumoto | |
| 6,823,283 B2 | 11/2004 | Steger et al. | |
| 6,825,847 B1 | 11/2004 | Molnar et al. | |
| 6,849,924 B2 | 2/2005 | Allison et al. | |
| 6,850,133 B2 | 2/2005 | Ma | |
| 6,879,207 B1 | 4/2005 | Nickolls | |
| 6,938,176 B1 | 8/2005 | Alben et al. | |
| 6,956,579 B1 | 10/2005 | Diard et al. | |
| 6,982,718 B2 | 1/2006 | Kilgard et al. | |
| 7,020,598 B1 | 3/2006 | Jacobson | |
| 7,058,738 B2 | 6/2006 | Stufflebeam, Jr. | |
| 7,069,369 B2 | 6/2006 | Chou et al. | |
| 7,069,458 B1 | 6/2006 | Sardi et al. | |
| 7,075,542 B1 | 7/2006 | Leather | |
| 7,075,797 B1 | 7/2006 | Leonard et al. | |
| 7,085,824 B2 | 8/2006 | Forth et al. | |
| 7,099,969 B2 * | 8/2006 | McAfee et al. | 710/107 |
| 7,136,953 B1 * | 11/2006 | Bisson et al. | 710/307 |
| 7,170,315 B2 | 1/2007 | Bakker et al. | |
| 7,174,407 B2 | 2/2007 | Hou et al. | |
| 7,174,411 B1 * | 2/2007 | Ngai | 710/316 |
| 7,185,135 B1 | 2/2007 | Briggs et al. | |
| 7,187,383 B2 | 3/2007 | Kent | |
| 7,225,287 B2 * | 5/2007 | Wooten | 710/309 |
| 7,246,274 B2 | 7/2007 | Kizer et al. | |
| 7,260,007 B2 | 8/2007 | Jain et al. | |
| RE39,898 E | 10/2007 | Nally et al. | |
| 7,293,125 B2 * | 11/2007 | McAfee et al. | 710/107 |
| 7,293,127 B2 * | 11/2007 | Caruk | 710/305 |
| 7,305,571 B2 | 12/2007 | Cranford, Jr. et al. | |
| 7,324,458 B2 | 1/2008 | Schoenborn et al. | |
| 7,340,541 B2 | 3/2008 | Castro et al. | |
| 7,363,417 B1 * | 4/2008 | Ngai | 710/316 |
| 7,383,412 B1 * | 6/2008 | Diard | 711/170 |
| 7,398,336 B2 | 7/2008 | Feng et al. | |
| 7,412,554 B2 * | 8/2008 | Danilak | 710/305 |
| 7,415,551 B2 | 8/2008 | Pescatore | |
| 7,424,564 B2 | 9/2008 | Mehta et al. | |
| 7,469,311 B1 * | 12/2008 | Tsu et al. | 710/307 |
| 7,478,187 B2 * | 1/2009 | Knepper et al. | 710/300 |
| 7,480,757 B2 * | 1/2009 | Atherton et al. | 710/313 |
| 7,480,808 B2 | 1/2009 | Caruk et al. | |
| 7,496,742 B2 * | 2/2009 | Khatri et al. | 713/1 |
| 7,500,041 B2 * | 3/2009 | Danilak | 710/305 |
| 7,525,986 B2 | 4/2009 | Lee et al. | |
| 7,536,490 B2 * | 5/2009 | Mao | 710/104 |
| 7,539,801 B2 * | 5/2009 | Xie et al. | 710/104 |
| 7,562,174 B2 * | 7/2009 | Danilak | 710/305 |
| 7,594,061 B2 | 9/2009 | Shen et al. | |
| 7,600,112 B2 * | 10/2009 | Khatri et al. | 713/100 |
| 7,617,348 B2 * | 11/2009 | Danilak | 710/305 |
| 7,631,128 B1 * | 12/2009 | Sgrosso et al. | 710/105 |
| 7,663,633 B1 | 2/2010 | Diamond et al. | |
| 7,705,850 B1 * | 4/2010 | Tsu | 345/501 |
| 7,756,123 B1 * | 7/2010 | Huang et al. | 370/359 |
| 7,777,748 B2 * | 8/2010 | Bakalash et al. | 345/505 |
| 7,782,325 B2 | 8/2010 | Gonzalez et al. | |
| 7,788,439 B1 * | 8/2010 | Tsu et al. | 710/307 |
| 7,793,029 B1 | 9/2010 | Parson et al. | |
| 7,793,030 B2 * | 9/2010 | Jenkins et al. | 710/307 |
| 7,849,235 B2 * | 12/2010 | Ihara et al. | 710/22 |
| 8,132,015 B1 | 3/2012 | Wyatt | |
| 8,532,098 B2 | 9/2013 | Reed et al. | |
| 8,687,639 B2 | 4/2014 | Kumar | |
| 2007/0011383 A1 * | 1/2007 | Berke et al. | 710/301 |
| 2008/0072098 A1 | 3/2008 | Hunsaker et al. | |
| 2009/0006708 A1 * | 1/2009 | Lim | 710/314 |
| 2009/0086747 A1 | 4/2009 | Naven et al. | |
| 2009/0254692 A1 | 10/2009 | Feehrer | |
| 2010/0309918 A1 | 12/2010 | Kumar | |

OTHER PUBLICATIONS

PCI-SIG. PCI Express Base Specification. Revision 1.1. Mar. 28, 2005.*

* cited by examiner

Exemplary Computer System 500

AGGREGATING UNOCCUPIED PCI-E LINKS TO PROVIDE GREATER BANDWIDTH

BACKGROUND

The development of cheaper, more capable integrated circuits have led to the development of portable computing systems featuring smaller, sleeker designs while retaining relatively sophisticated computing capabilities. These computing systems refer primarily to laptops and netbooks, but also include smart phones, and portable audio devices, portable video devices and portable video game consoles. However, as the recent trend of miniaturizing portable computing systems continues, the space available for hardware for these designs has progressively decreased. As a result, the optimization of hardware design and architecture has become of primary importance.

Typical computing devices include at least a collection of microprocessors or a central processing unit (CPU), some memory, a motherboard (e.g., central printed circuit board) featuring a chipset, and at least one graphics processing unit for generating video output to a display. In some conventional motherboard designs, the chipset is arranged into two separate component hubs, which are commonly referred to as the "northbridge" and "southbridge," respectively. The northbridge typically handles communications among the CPU, random access memory (RAM), video output interfaces, and the southbridge. In many contemporary netbook and laptop implementations, the video output interface is implemented as an integrated graphics processing unit. The southbridge, on the other hand, is one or more chips that provide a platform to support a plurality of peripheral components, such as input/output devices and mass storage devices. In many implementations, the southbridge may also include integrated peripherals, such as audio controllers, network interface cards, universal serial bus (USB) and PCI-express connections, etc.

Traditionally, netbooks and laptops have used integrated graphics solutions such as integrated graphics processing units (GPUs) coupled to the northbridge. Integrated graphics processing units are graphics processors that utilize a portion of a computer's system memory rather than having its own dedicated memory. In general, integrated GPUs are cheaper to implement than dedicated or "discrete" GPUs, and offer relatively improved battery life and lower power usage, but at the cost of reduced capability and performance levels relative to discrete GPUs. Advantageously, manufacturers of netbooks and laptops have begun to offer configurations with higher graphics processing capabilities by providing computer systems that include additional discrete graphics processing units in addition to the integrated graphics processors.

Discrete or "dedicated" GPUs are distinguishable from integrated GPUs by having higher performance and also having local memory dedicated for use by the GPU that the GPU does not share with the underlying computer system. Commonly, discrete GPUs are implemented on discrete circuit boards called "video cards" which include, among other components, a GPU, the local memory, communication buses and various output terminals. In conventional applications, these video cards typically interface with the main circuit board (e.g., motherboard) of a computing system through a PCI Express (PCI-e) interface, upon which the video card may be mounted. In general, discrete GPUs are capable of significantly higher performance levels relative to integrated GPUs but typically require and consume higher levels of power relative to integrated graphics solutions. Portable computing devices with both integrated and discrete graphics processing solutions often offer a mechanism or procedure that enables the user to alternate usage between the particular solutions so as to manage performance and battery life according to situational needs or desired performance levels.

As mentioned above, in typical netbooks and laptops, the PCI Express interface is a component of the southbridge. However, unlike PCI-e interfaces in other computing systems such as desktops, the PCI-e interface of a portable computing device is often of a reduced size and, consequently, of a reduced capacity. In a typical configuration, the PCI-e interface of any computing device comprises a plurality of links, with each link comprising a further plurality of "lanes," and being configured to independently couple to a peripheral device. The number of lanes in a link coupled to a peripheral device correlates with the bandwidth of the connection, and thus, couplings between a peripheral device and a link with larger amounts of lanes have greater bandwidth than couplings with links comprised of only single lanes. Traditionally, the number of links in a PCI-e interface of a portable computing device may be configured by the manufacturer in separate configurations to suit specific hardware implementations.

In a popular configuration, the links in PCI-e interface of a portable computing device may be arranged in either of two combinations totaling up to four lanes. For example, implementations can comprise either a single link of four lanes (1×4), thereby offering relatively greater bandwidth for a coupled device. Alternatively, implementations may feature four separate links, with each link capable of being coupled to a separate device but limited to a single lane (4×1) with a correspondingly low bandwidth. Thus, whenever the PCI-e interface is coupled to one device, the single link (1×4) configuration may be optimal, but multiple devices require additional links that adversely impact the amount of bandwidth and throughput of each connection.

Unfortunately, since netbooks and laptops are often intended to be used with network connections, chipset manufacturers of computing devices that will include a discrete GPU will invariably manufacture southbridges (and/or motherboards in general) with PCI-e interfaces having four separate links of one lane each, one of which is occupied by a network controller (e.g., a network interface card). This results in the extremely inefficient configuration wherein one link is coupled to the network controller, another link is coupled to the graphics processing unit, and the other two links remaining unoccupied (or coupled to additional devices). While the bandwidth from a link with only one lane may be sufficient to run certain applications on certain devices, for usage in graphics processing a link having only a single lane is often insufficient and likely to drastically and adversely impact the performance of the discrete graphics processing unit. Moreover, this configuration results not only in substandard performance for discrete graphics processing units, but also commonly results in a waste of the remaining unoccupied links.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to systems and a method that allows the aggregation of multiple interfaces of a data communication bus to provide greater bandwidth for communication between a peripheral device and system memory within a computing system. In one embodiment, unoccupied interfaces of the data communication bus are combined with an interface coupled to a peripheral device to increase the bandwidth of data transfer requests between the peripheral device and the system memory.

In another embodiment, a process is provided that enables the distribution of requests for accessing system memory (e.g., direct memory access requests) initiated by a discrete graphics processing unit among aggregated links of a PCI-e interface. The process comprises receiving the requests in a link aggregator, parsing the requests to correspond to the number of aggregated links, and distributing the requests among the links evenly. In further embodiments, the requests may be distributed in a round robin fashion.

In yet another embodiment, an apparatus is provided for aggregating unoccupied links of a PCI-e interface to increase the bandwidth to a discrete graphics processing unit in a system with two or more graphics processing units. According to some embodiments, the system includes a printed circuit board with: a first and second graphics processing units; system memory; and a plurality of peripheral components including a PCI-e interface, wherein the PCI-e interface is comprised of a plurality of links which may be coupled to a plurality of devices, including the second graphics processing unit, to facilitate the transfer of data between the devices and the system memory. According to this embodiment, a link aggregator will aggregate the unoccupied links of the PCI-e interface to increase the bandwidth of requests from the second graphics processing unit and the system memory.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
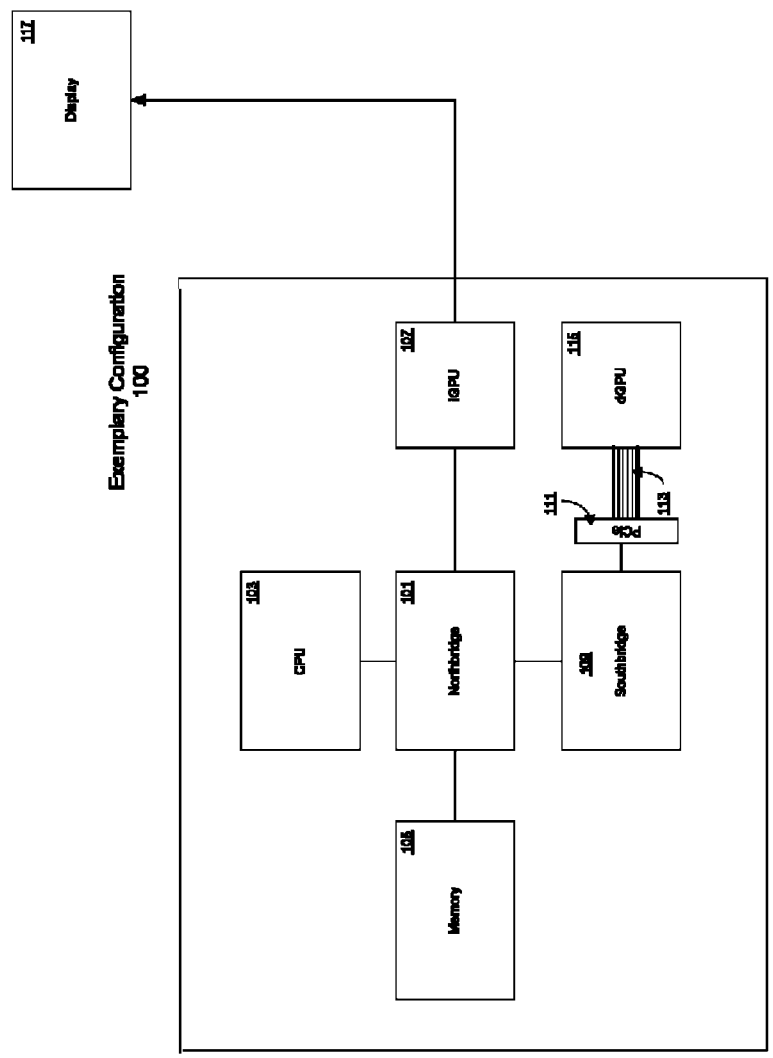
FIG. 1 depicts a block diagram of an exemplary hardware configuration of a central printed circuit board featuring a PCI-e interface with one link, in accordance with various embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIG. 4) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Link Configurations

Specific configurations of the central printed circuit board (e.g., motherboard) in different portable computing devices may vary according to design and/or manufacturer preference, but often include: a central processing unit (CPU), system memory, a chipset that enables communication between various components within the computing device and the central printed circuit board specifically, as well as one or more graphics processing units. These graphics processing units may be implemented as integrated and/or discrete. For computing devices that include discrete graphics processing units, data may be transferred between the discrete graphics processing units and the system memory or the CPU via a communication bus. A popular communication bus standard is referred to as PCI Express or, "PCI-e," alternatively. The PCI-e interface of a typical portable computing device comprises a plurality of sub-interfaces (referred to as "links") which may be arranged according to either of two combinations totaling up to four lanes. For example, implementations can comprise either a single sub-interface (link) of four serially arranged lanes (1×4), thereby offering relatively greater bandwidth for a coupled device but allowing a coupling of only one device to the PCI-e interface, or, alternatively, four sub-interfaces (links) of a single lane each that allows up to four devices to be coupled to the interface, but at lower data transfer rates.

FIG. 1 displays a block diagram of an exemplary hardware configuration 100 of a central printed circuit board featuring a PCI-e interface with one link, in accordance with various embodiments of the present invention. As depicted, FIG. 1 depicts a chipset comprising two separate chips (e.g., northbridge 101 and southbridge 109, respectively) operating as hubs for various components. As displayed, the two chips (e.g., northbridge 101 and southbridge 109) are communicatively coupled. Additional features of FIG. 1 may include system memory (e.g., memory 105) and a plurality of graphics processing devices (e.g., iGPU 107 and dGPU 115).

In one embodiment, a central processing device (e.g., CPU 103) and system memory 105 are coupled to (or even disposed on) one of the chips. In further embodiments, the CPU 103 and the system memory may be coupled to (or disposed on) the same chip. As shown, both CPU 103 and memory 105 are coupled to the northbridge 101. According to some embodiments, the configuration 100 may include a plurality of graphics processing devices. The plurality of graphics processing devices may include, for example, an integrated graphics processing unit (e.g., iGPU 107) coupled to the northbridge 101 and also coupled to a display device (e.g., display 117). In one embodiment, the display device 117 is coupled to an output interface of the integrated graphics processing unit, and display data generated by other components (e.g., at a dGPU) must be passed to the display device 117 through the iGPU. According to some embodiments, the display device 117 may be implemented as, for example, a discrete monitor or the display panel of a portable computing device.

According to some embodiments, a chip of the printed circuit board may include one or more integrated data communication buses. As depicted in FIG. 1, a data communication bus (e.g., PCI-e 111) is coupled with the southbridge 109. In some embodiments, the data communication bus may include an interface to couple with one or more peripheral devices, such as a discrete graphics processing unit (e.g., dGPU 115). In a typical embodiment, the interface may comprise a plurality of links, with each link comprising a plurality of lanes. As depicted in FIG. 1, the PCI-e 111 interface is configured to provide a single link (e.g., link 113) comprising four lanes.

As presented, the link 113 couples the PCI-e 111 interface (and therefore the southbridge 109) with the dGPU 115, and enables the transfer of data between the dGPU and other components of the printed circuit board. In alternate embodiments, other peripheral devices utilizing the same communication standard, that is, other devices compatible with the PCI-e interface may be used in place of a dGPU. For example, a network interface card is a common peripheral device used in many mobile computing devices that is typically compatible with the PCI-e data transfer standard.

Figure 2:
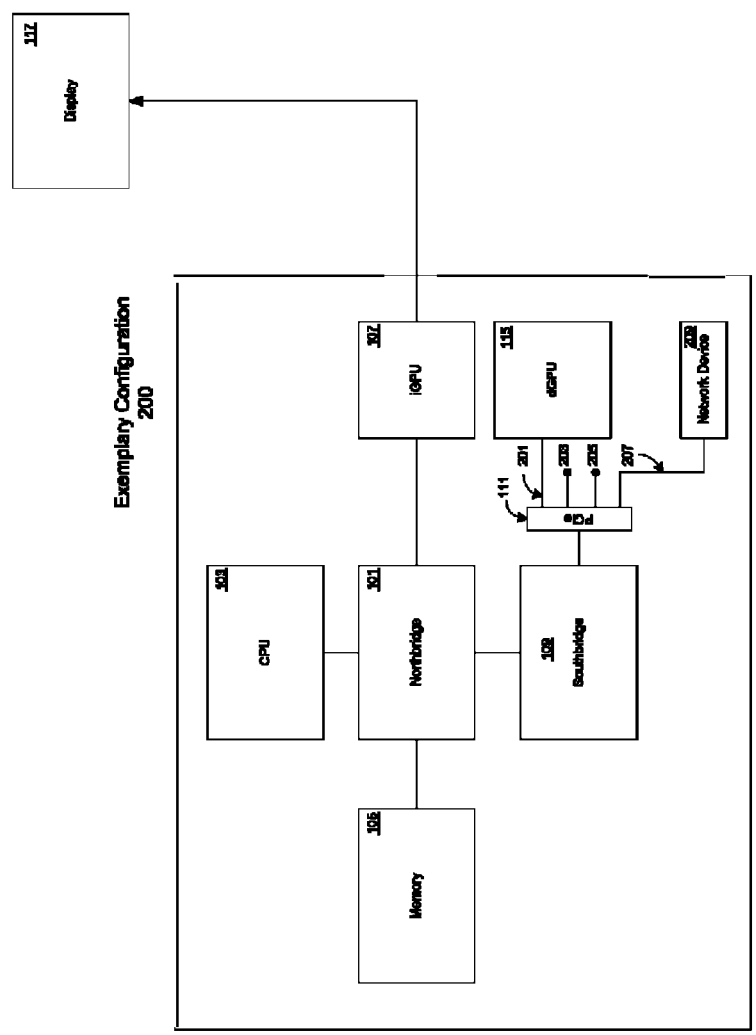
FIG. 2 depicts a block diagram of an alternate exemplary hardware configuration of a central printed circuit board featuring a PCI-e interface with multiple PCI-e links, in accordance with various embodiments of the present invention.

FIG. 2 displays a block diagram of an alternate exemplary hardware configuration 200 of a central printed circuit board featuring a PCI-e interface with multiple PCI-e links, rather than the single, larger PCI-e link as was featured in FIG. 1, in accordance with various embodiments of the present invention. As depicted, FIG. 2 depicts the chipset, comprising the northbridge 101 and southbridge 109; system memory (e.g., memory 105); display 117; and plurality of graphics processing devices (e.g., iGPU 107 and dGPU 115) as disclosed above with reference to FIG. 1. FIG. 2 however, depicts an alternate configuration, wherein the PCI-e interface 111 shared with FIG. 1 is no longer coupled to only one peripheral device (and thus requiring only one link) as in FIG. 1, but instead is coupled to multiple devices. For example, dGPU 115 is coupled to PCI-e interface 111 via link 201 and Network Device 209 is coupled to PCI-e interface 111 via link 207, thereby necessitating the configuration with four separate links, e.g., links 201, 203, 205, and 207.

According to some embodiments, network device 209 may be implemented as a network controller, such as a network interface card. Unfortunately, in typical configurations, when the number of peripheral devices coupled to the PCI-e interface is less than the number of links provided, the unoccupied links and their corresponding capability for data transport is wasted. For example, while link 201 is used by the dGPU 115 to couple to the southbridge 109, and link 207 of the PCI-e interface 111 is used by the Network Device 209 to couple to the southbridge 109, links 203 and 205 are unoccupied. Consequently, until such a time as additional peripheral devices are added to the PCI-e interface, links 203 and 205 are wasted.

Link Aggregation

According to embodiments of the present invention, a system, a method, and an apparatus that allows the aggregation of multiple links of a data transfer interface (e.g., a communication bus) to provide greater bandwidth for communication between a peripheral device and system memory within a computing system are provided. In a typical embodiment, a data transfer interface such as an exemplary PCI-e interface having a plurality of occupied and unoccupied links will have the unoccupied links aggregated by a hardware aggregator with a link directly coupled to a peripheral device, such as a discrete graphics unit. Such link aggregation increases the bandwidth of requests to access data (e.g., in the system memory) of the particular peripheral device. In one embodiment, the bandwidth of direct memory access requests between a dGPU and system memory may be increased by the incorporation of the bandwidth aggregator device. Accordingly, increased throughput and data transfer rates in a portable computing system may be advantageously increased to improve user experience. Moreover, while the invention is described herein with specificity to the PCI-e interface, the invention is operable over communication standards other than PCI-e, which is being described herein for exemplary purposes only.

Figure 3:
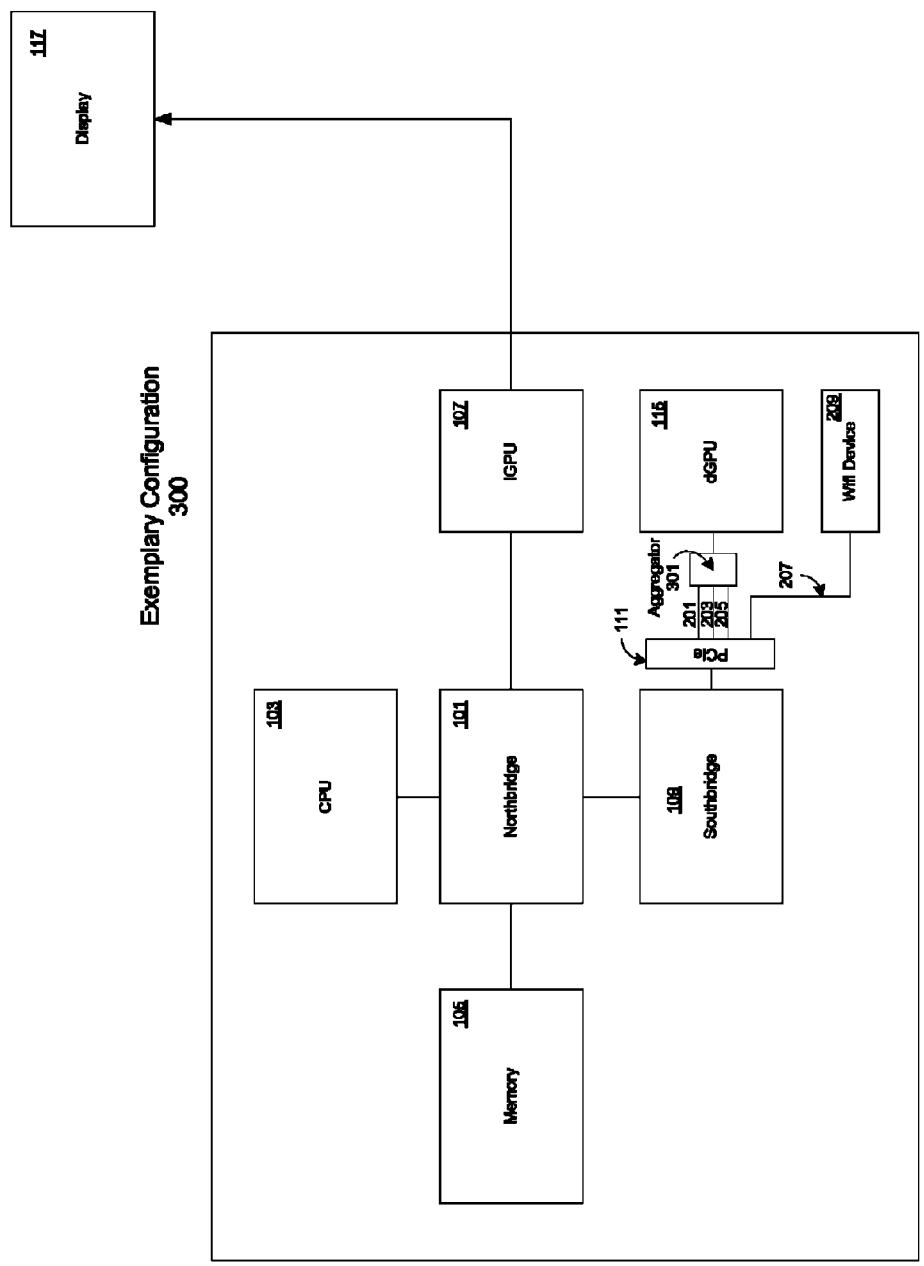
FIG. 3 depicts a block diagram of an alternate exemplary hardware configuration of a central printed circuit board featuring a PCI-e interface with multiple links that are aggregated by a bandwidth aggregator, in accordance with various embodiments of the present invention.

FIG. 3 displays a block diagram of an alternate exemplary hardware configuration 300 of a central printed circuit board featuring a PCI-e interface with multiple links that are aggregated by a bandwidth aggregator, in accordance with various embodiments of the present invention. As depicted, FIG. 3 depicts the chipset, comprising the northbridge 101 and southbridge 109; system memory (e.g., memory 105); display 117; and plurality of graphics processing devices (e.g., iGPU 107 and dGPU 115) as disclosed above with reference to FIG. 1. FIG. 3, however, depicts an alternate embodiment, wherein the PCI-e interface 111 is coupled to a bandwidth aggregator 301 and an additional peripheral device. As depicted, links 201, 203 and 205 are coupled to the aggregator 301, which is subsequently coupled to the dGPU 115. The remaining link of the PCI-e interface 111 remains coupled to Network Device 209 via link 207, as described with reference to FIG. 2.

According to some embodiments, the bandwidth aggregator 301 is provided to couple to a plurality of unused interfaces of a data communication bus interface (e.g., one or more unoccupied single-lane PCI-e links) with an interface coupled to a peripheral device to increase the bandwidth of data transfer between the communication bus and the peripheral device. By aggregating the unused links with an occupied link, the bandwidth available for a peripheral device (such as a discrete graphical processing unit) can be increased significantly, thereby allowing greater rates of data transfer and a corresponding increase in processing performance. In some embodiments, an original equipment manufacturer (OEM) of the printed circuit board (e.g., motherboard) may manufacturer a bandwidth aggregator to couple to the desired number of interfaces of the data communication bus.

Communicating Data Over an Aggregated PCI-e Interface

Figure 4:
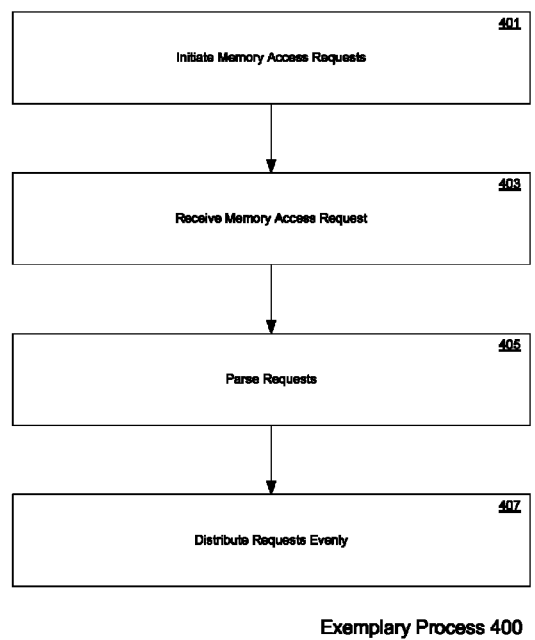
FIG. 4 depicts an exemplary flowchart of a process of distributing memory access requests from a peripheral device over an aggregated PCI-e link, in accordance with various embodiments of the present invention.

With reference to FIG. 4, an exemplary flowchart 400 of a process for communicating data over an aggregated PCI-e interface is depicted, in accordance with various embodiments of the present invention. In one embodiment, the process is performed in a computing system comprising at least a system memory, a discrete graphics processing unit, a data communication bus comprising multiple interfaces (such as a PCI-e interface featuring a plurality of links) to transfer data between the discrete graphics processing unit and the system memory, and a bandwidth aggregator for combining some or all of the interfaces of the data communication bus into a single, aggregated interface coupled to the graphics processing unit. Steps 401-407 describe exemplary steps of the flowchart 400 in accordance with the various embodiments herein described. In one embodiment, flowchart 400 is provided to distribute requests evenly between the combined portions of the interface.

At step 401, one or more direct memory access requests are initiated by the discrete graphics processing unit. The direct memory access requests may comprise, for example, requests for data corresponding to a desired display output. Direct memory access requests allow the dGPU to read and write to and from the system memory without severely taxing the CPU of the system as would a traditional memory access request, thus allowing the CPU to perform other tasks simultaneously and potentially achieving greater efficiency of system resources.

At step 403, the memory access requests initiated in step 401 are received by the bandwidth aggregator. According to some embodiments, the bandwidth aggregator may be coupled directly between the data communication interface and the graphics processing unit, and memory access requests initiated by the graphics processing unit in step 401 may be received directly by the data aggregator at step 403. At step 405, the bandwidth aggregator may parse the received memory access requests from, for example, a stream of contiguous data received from the graphics processing unit into individual memory access requests suitable for distribution and communication over the data communication interface.

At step 407, the memory access requests initiated by the dGPU at step 401 and received and parsed by the aggregator at steps 403 and 405, respectively, are distributed evenly over the number of aggregated interfaces (e.g., links). In one embodiment, distribution may be performed according to a round robin schedule. According to further embodiments, the aggregator may monitor the distribution of requests such that exceptionally large or delayed requests occupying one link or interface may be allocated and distributed through an alternate link or interface. According to some embodiments, instructions to the dGPU initiated by the CPU of the system are communicated only through a link originally coupled to the dGPU and not through the other, previously unoccupied links that have been aggregated.

Exemplary Computing Device

Figure 5:
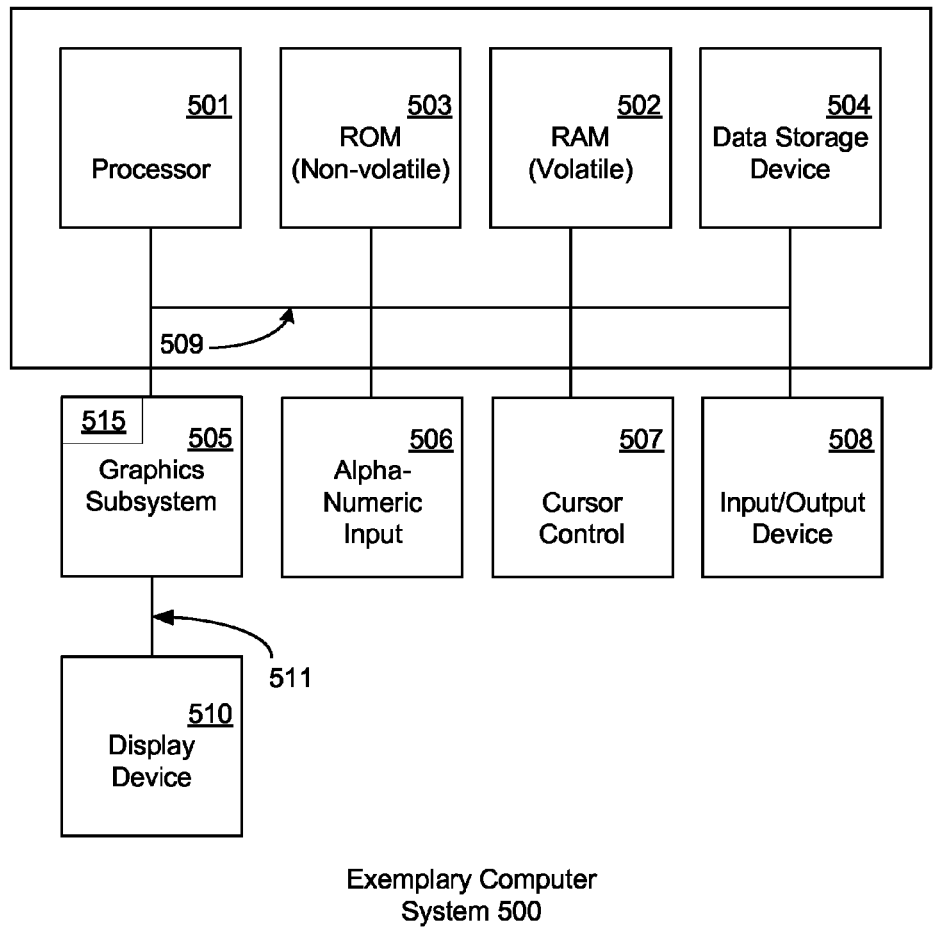
FIG. 5 depicts a block diagram of a basic computing system, in accordance with various embodiments of the present invention.

As presented in FIG. 5, an exemplary system for implementing embodiments includes a general purpose computing system environment, such as computing system 500. In its most basic configuration, computing system 500 typically includes at least one processing unit 501 and memory, and an address/data bus 509 (or other interface) for communicating information. Depending on the exact configuration and type of computing system environment, memory may be volatile (such as RAM 502), non-volatile (such as ROM 503, flash memory, etc.) or some combination of the two.

Computer system 500 may also comprise an optional graphics subsystem 505 for presenting information to the computer user, e.g., by displaying information on an attached display device 510, connected by a video cable 511. According to embodiments of the present claimed invention, a bandwidth aggregator 515 is coupled to the graphics subsystem 505 and a communication bus 509 (e.g., a PCI-e interface) for aggregating unused portions of the interface and increasing data transfer rates to and from the graphics subsystem 505. In alternate embodiments, display device 510 may be integrated into the computing system (e.g., a laptop or netbook display panel) and will not require a video cable 511. In one embodiment, process 500 may be performed, in whole or in part, by graphics subsystem 505 in conjunction with bandwidth aggregator 515 and memory 502, with any resulting output displayed in attached display device 510.

Additionally, computing system 500 may also have additional features/functionality. For example, computing system 500 may also include additional storage (removable and/or non-removable) including, but not limited to, magnetic or optical disks or tape. Such additional storage is illustrated in FIG. 6 by data storage device 504. Computer storage media includes volatile and nonvolatile, removable and non-removable media implemented in any method or technology for storage of information such as computer readable instructions, data structures, program modules or other data. RAM 502, ROM 503, and data storage device 504 are all examples of computer storage media.

Computer system 500 also comprises an optional alphanumeric input device 506, an optional cursor control or directing device 507, and one or more signal communication interfaces (input/output devices, e.g., a network interface card) 508. Optional alphanumeric input device 506 can communicate information and command selections to central processor 501. Optional cursor control or directing device 507 is coupled to bus 509 for communicating user input information and command selections to central processor 501. Signal communication interface (input/output device) 508, also coupled to bus 509, can be a serial port. Communication interface 509 may also include wireless communication mechanisms. Using communication interface 509, computer system 500 can be communicatively coupled to other computer systems over a communication network such as the Internet or an intranet (e.g., a local area network), or can receive data (e.g., a digital television signal).

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. An electronic system, comprising:
   a printed circuit board;
   a processor disposed on the printed circuit board;
   a memory disposed on the printed circuit board;
   a data transfer interface, disposed on the printed circuit board and comprising a plurality of links for transferring data through the data transfer interface;
   a peripheral device, coupled to the data transfer interface over a first link of the plurality of links and configured to perform a plurality of instructions from the processor; and
   a bandwidth aggregator, coupled to the peripheral device and unoccupied links of the plurality of links, the bandwidth aggregator being operable to distribute memory access requests to and from the peripheral device,
   wherein the unoccupied links of the plurality of links are combined with the first link to form an aggregated data transfer link operable to communicate data between the peripheral device and the memory with a greater bandwidth than the first link alone, further wherein, the plurality of instructions from the processor are sent to the peripheral device solely through the first link of the aggregated data transfer link.

2. The electronic system of claim 1, wherein the peripheral device comprises a discrete graphics processing unit (dGPU), and wherein further the processor comprises a central processing unit (CPU).

3. The electronic system according to claim 2, wherein the data transfer interface is substantially compliant with the PCI-e interface standard.

4. The electronic system of claim 1, wherein the data transfer interface comprises four links.

5. The electronic system of claim 4, wherein each link of the four links is configurable to be coupled to a peripheral device.

6. The electronic system of claim 1, further comprising an integrated graphical processing unit (iGPU) disposed on the printed circuit board.

7. The electronic system of claim 1, further comprising a network interface card.

8. The electronic system of claim 7, wherein the network interface card occupies a link of the data transfer interface.

9. The electronic system according to claim 8, wherein direct memory access requests initiated by the peripheral device are distributed across the links comprising the aggregated data transfer link according to a round robin schedule.

10. The electronic system of claim 1, wherein the bandwidth aggregator is operable to receive direct memory access requests initiated by the peripheral device and alternately distributes the requests across the links comprising the aggregated data transfer link.

11. The electronic system according to claim 1, wherein requests initiated from the processor are communicated to the peripheral device through the first link.

12. The electronic system according to claim 1, wherein the bandwidth aggregator is manufactured to directly couple a desired number of sub-interfaces of the data transfer interface.

13. The electronic system according to claim 1, wherein the system comprises a mobile computing system.

14. The method according to claim 1, wherein a desired number of sub-interfaces of the data transfer interface is directly coupled by the bandwidth aggregator by an original equipment manufacturer of the printed circuit board.

15. A method for communicating data over an aggregated PCI-e interface, the method comprising:
   receiving a plurality of programmed instructions in a discrete graphics processing unit from a processor of a computing system;
   initiating a plurality of memory access requests in the discrete graphics processing unit;
   receiving the plurality of memory access requests in a bandwidth aggregator coupled to the discrete graphics processing unit and a data communication interface, the bandwidth aggregator aggregating a plurality of sub-interfaces of the data communication interface with a first sub-interface of the data communication interface coupling the data communication interface with the discrete graphics processing unit;
   parsing the plurality of memory access requests to correspond to the aggregated plurality of sub-interfaces;
   alternately distributing the plurality of memory access requests across the aggregated plurality of sub-interfaces of a data communication interface; and
   monitoring the plurality of memory access requests being distributed by the bandwidth aggregator,
   wherein the aggregated plurality of sub-interfaces of the data communication interface is operable to communicate data between the discrete graphics processing unit and the data communication interface with a greater bandwidth than a single sub-interface of the data communication interface,
   wherein, the plurality of programmed instructions from the processor are sent to the peripheral device solely through the first sub-interface of the aggregated plurality of sub-interfaces.

16. The method according to claim 15, wherein the aggregated plurality of sub-interfaces comprises a sub-interface of the data communication interface coupled to the discrete graphics processing unit and a plurality of unoccupied sub-interfaces of the data communication interface.

17. The method according to claim 16, further comprising:
   receiving, in the discrete graphics processing unit, instructions from a CPU of the system via the sub-interface of the data communication interface coupled to the discrete graphics processing unit.

18. The method according to claim 15, wherein the plurality of memory access requests comprises at least one of the group comprising: a memory read request and a memory write request.

19. The method according to claim 15, wherein the data communication interface is substantially compliant with a PCI-e standard and
   wherein the monitoring the plurality of memory access requests is performed in response to alternately distributing the plurality of memory access requests across an aggregated plurality of sub-interfaces of a data communication interface.

20. The method according to claim 15, wherein receiving the plurality of memory access requests in the bandwidth aggregator comprises receiving the plurality of memory access requests as a stream of contiguous data from the discrete graphics processing unit.

21. The method according to claim 20, wherein parsing the plurality of memory access requests to correspond to the aggregated plurality of sub-interfaces comprises parsing the stream of contiguous data into a plurality of individual memory access requests.

22. An apparatus for enabling the electronic coupling of a plurality of components in an electronic device, the apparatus comprising:
- a motherboard comprising a chipset, the chipset comprising a northbridge and a southbridge;
- a central processing unit coupled to the northbridge;
- a first graphics processing unit, wherein the first graphics processing unit is
- a system memory disposed on the motherboard, the system memory electronically coupled to the northbridge;
- a PCI-E interface integrated on the southbridge, the PCI-E interface comprising a plurality of links;
- a second graphics processing unit coupled to the motherboard through a first link of the plurality of links of the PCI-E interface; and
- a link aggregator operable to distribute and monitor memory access requests to the second graphics processing unit through an aggregated data transfer link comprising an unoccupied portion of the plurality of links aggregated with the first link of the plurality of links, and coupling the second graphics processing unit and the PCI-E interface, the link aggregator being operable to increase bandwidth for communication between the second graphics processing unit and the system memory,
- wherein, the central processing unit is configured to send a plurality of instructions to at least one of: the first graphics processing unit and the second graphics processing unit,
- further wherein the plurality of instructions from the central processing unit are sent to the second graphics processing unit solely through the first link of the aggregated data transfer link.

23. The apparatus according to claim 22, wherein a link of the plurality of links is coupled to a network interface card.

24. The apparatus according to claim 22, wherein the link aggregator is disposed on the motherboard between the PCI-E interface and the second graphical processing unit.

25. The apparatus according to claim 22, wherein the second graphical processing unit is capable of higher performance than the first graphical processing unit.

26. The system according to claim 1, wherein the processor is configured to send graphics rendering instructions to the peripheral device through the data transfer interface.

27. The apparatus according to claim 22, wherein the motherboard further comprises a processor operable to send graphics rendering instructions to the second graphics processing unit through the PCI-E interface.

* * * * *